United States Patent
Tomiyama

(10) Patent No.: US 6,792,451 B1
(45) Date of Patent: Sep. 14, 2004

(54) METHOD AND SERVICE STATION FOR EDITING AND DELIVERING IMAGE DATA ACROSS THE INTERNET

(75) Inventor: Eiichi Tomiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/442,006

(22) Filed: Nov. 17, 1999

(30) Foreign Application Priority Data

Nov. 19, 1998 (JP) .......................................... 10-330038

(51) Int. Cl.⁷ .............................................. G06F 15/16
(52) U.S. Cl. ....................... 709/217; 709/218; 709/219; 709/203
(58) Field of Search ................................ 709/203, 217, 709/206, 218, 219, 246

(56) References Cited

U.S. PATENT DOCUMENTS

| | | | | | |
|---|---|---|---|---|---|
| 5,757,379 | A | * | 5/1998 | Saito | 345/645 |
| 6,192,184 | B1 | * | 2/2001 | Shiota et al. | 386/52 |
| 6,366,698 | B1 | * | 4/2002 | Yamakita | 382/187 |
| 6,396,537 | B1 | * | 5/2002 | Squilla et al. | 348/14.02 |

FOREIGN PATENT DOCUMENTS

| | | | |
|---|---|---|---|
| EP | 0865192 | * | 10/1998 |
| JP | 61-88654 | | 5/1986 |
| JP | 8-138033 | | 5/1996 |
| JP | 8-214373 | | 8/1996 |
| JP | 8-227425 | | 9/1996 |
| JP | 10-149309 | | 6/1998 |
| JP | WO 98/30019 | * | 7/1998 |
| JP | 10-243263 | | 9/1998 |
| JP | 10-260916 | | 9/1998 |

OTHER PUBLICATIONS

Japanese Office Action, dated Mar. 21, 2001, with English language translation of Japanese Examiner's comments.

* cited by examiner

*Primary Examiner*—Mehmet B. Geckil
(74) *Attorney, Agent, or Firm*—Whitham, Curtis & Christofferson, P.C.

(57) ABSTRACT

In order to transmit image data, across the internet, from a mobile terminal, a particular station is provided in a mobile communication network that is linked to the internet. A subscriber to the mobile communication network transmits instructions, which includes image data editing information and image data destination information, to the particular station. Thereafter, the subscriber transmits image data to the particular station wherein the image data is edited according to the image data editing information. The edited image data is then stored in a suitable memory, after which the particular station informs, across the internet, an image data receiver, specified by the destination information, that the edited image data is ready to be downloaded from the memory by the image data receiver. The order of uploading the pieces of the image data editing and destination information can be reversed.

15 Claims, 4 Drawing Sheets

FIG. 4

| SENDER'S TELEPHONE NUMBER | DESTINATION (E-MAIL ADDRESS) | EDITING DATA | MESSAGE |
|---|---|---|---|
| 1. xxx-xxx-xxxx | mrx@xx.nec.co.jp | frame (yes) | Happy New Year!! From Okinawa |
| 2. xxx-xxx-xxxx | mmm@kk.ww.co.jp | No. 1 image data frame (no) | Our new baby born last month |
| | mxm@om.nec.co.jp | No. 2 image data frame (yes) sepia color | Our new house |
| 3. xxx-xxx-xxxx | abc@ab.cd.co.jp | color → mono | Travelling now!! Do you know where we are? |

METHOD AND SERVICE STATION FOR EDITING AND DELIVERING IMAGE DATA ACROSS THE INTERNET

BACKGROUND OF THE INVENTION

1. Field of the Invention

The present invention relates generally to a method and apparatus for editing and delivering image data transmitted from mobile terminals.

2. Description of the Related Art

It has become popular to take pictures using electronic still cameras using charge-coupled-devices (CCDs) (for example). On the other hand, due to the advent of the Internet, the digital image data, stored in the electronic still camera, can be transmitted, via a mobile terminal, to another information terminals such as display-equipped mobile terminals, personal computers, etc. across the Internet. However, due to limited functions of editing image data of the mobile terminal, it is obliged to transmit the image data to another information terminals without adding any modification or edition to the image data.

Japanese Laid-open Patent Application No. 8-138033 discloses a system wherein a large scale virtual server is established by virtually combining a plurality of facsimile, OCR (optical character reader) servers, etc. separately located in a network, thereby to facilitate processing of different type image data.

Further, Japanese Laid-open Patent Application No. 8-214373 discloses a service station provided in a communication network. Image data transmitted from mobile terminals are stored in the service station and then delivered to the intended destinations. The image data stored in the service station can be retrieved in response to a request by the image data transmitter, and accordingly, it is possible for the mobile terminal to confirm the image data already dispatched therefrom.

Still further, Japanese Laid-open Patent Application No. 10-149309 discloses a system wherein a plurality of fixed service stations each having a large memory capacity are provided at various convenient places in a city. Mobile terminals are able to transmit image data to the nearby service stations, and the data stored in the service station is relayed to the instructed destination. Therefore, it is possible to compensate for the limited memory capacity of each mobile terminal.

Each of the above-mentioned related techniques, however, fails to disclose or teach a service station for receiving image data from mobile terminals, editing the image data, and delivering the edited image data in response to a request by an intended image data receiver across the Internet.

SUMMARY OF THE INVENTION

It is therefore an object of the present invention to provide a method of receiving image data from mobile terminals, editing the image data, and delivering the edited image data in response to a request by an intended image data receiver across the Internet.

Another object of the present invention is to provide a service station (or apparatus) for receiving image data from mobile terminals, editing the image data, and delivering the edited image data in response to a request by an intended image data receiver across the Internet.

These objects are fulfilled by the technique wherein in order to transmit image data, across the internet, from a mobile terminal, a particular station (service station) is provided in a mobile communication network that is linked to the internet. A subscriber to the mobile communication network transmits instructions, which includes image data editing information and image data destination information, to the particular station. Thereafter, the subscriber transmits image data to the particular station wherein the image data is edited according to the image data editing information. The edited image data is then stored in a suitable memory, after which the particular station informs, across the internet, an image data receiver, specified by the destination information, that the edited image data is ready to be downloaded from the memory by the image data receiver. The order of uploading the pieces of the image data editing and destination information can be reversed.

One aspect of the present invention resides in a method of transmitting image data across the Internet, comprising the steps of: (a) receiving, at a particular station provided in a mobile communication network, instruction data transmitted thereto from a subscriber of said mobile communication network, said instruction data including image data editing information and image data destination information, and said mobile communication network being linked to the Internet; (b) receiving image data from said subscriber at said particular station; (c) editing said image data according to said image data editing information at said particular station; (d) storing the edited image data in a memory provided in said particular station; and (d) informing, across the Internet, an image data receiver, specified by said destination information, that the edited image data is ready to be downloaded from said memory by said image data receiver.

Another aspect of the present invention resides in an apparatus (or service station), provided in a particular station in a mobile communication network, for transmitting image data across the Internet, comprising: a controller for controlling an overall operation of said apparatus; an editing data memory for storing instruction data transmitted from a subscriber of said mobile communication network, said instruction data including image data editing information and image data destination information, and said mobile communication network being linked to the internet; an image data memory for storing image data from said subscriber; an image data editor for editing said image data according to said image data editing information; and an edited image data memory for storing the edited image data, wherein said controller informs, across the internet, an image data receiver specified by said destination information that the edited image data is ready to be downloaded from said memory by said image data receiver.

BRIEF DESCRIPTION OF THE DRAWINGS

The features and advantages of the present invention will become more clearly appreciated from the following description taken in conjunction with the accompanying drawings in which like member or elements are denoted by like reference numerals and in which:

FIG. 4 is a table showing a plurality of pieces of data which relate to image data editing/delivering operations of the preferred embodiment of the present invention and have been transmitted to one portion of FIG. 1 from a plurality of mobile communication network subscribers.

DETAILED DESCRIPTION OF THE PREFERRED EMBODIMENTS

One preferred embodiment of the present invention will be described with reference to the accompanying drawings.

Figure 1:
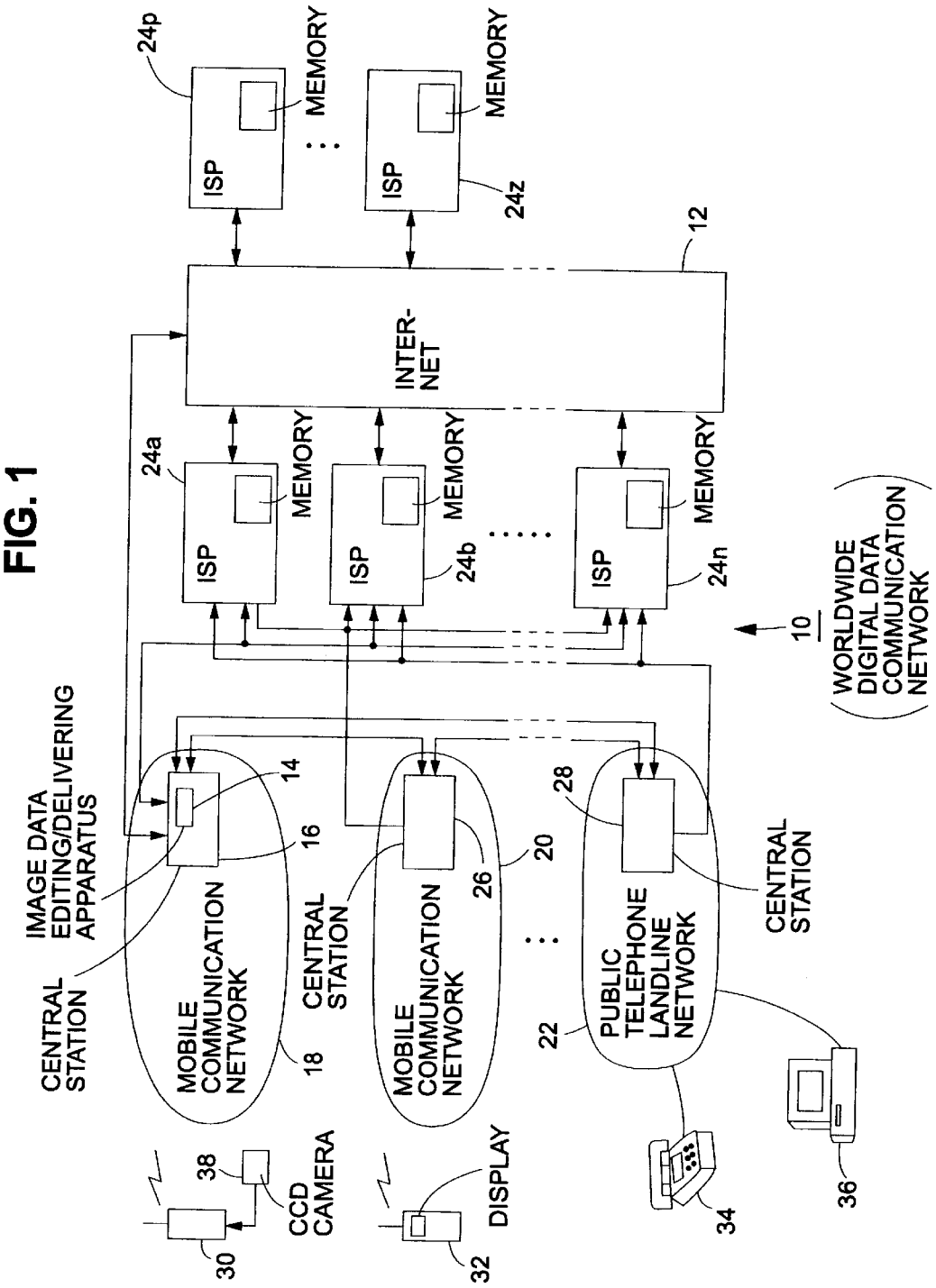
FIG. 1 is a diagram schematically showing a worldwide digital data communication network to which the present invention is applicable.

Referring to FIG. 1, a worldwide digital data communication network 10, which includes the Internet 12, is schematically illustrated. As is well known in the art, the Internet 12 is a collection of thousands of individual networks and organization (not shown), each of which is run and paid for on its own. Each network cooperates with other networks to direct Internet traffic so as to pass information among them.

An image data editing/delivering apparatus 14 according to the instant embodiment of the present invention, is provided in a particular station 16, such as a mobile central station (viz., mobile switching center), in a mobile communication network 18. The worldwide digital data communication network 10 itself is well known in the art and as such, a brief description thereof is given for the sake of simplifying the disclosure.

As shown, the worldwide digital data communication network 10 comprises, in addition to the Internet 12 and the mobile communication network 18, a plurality of another mobile communication networks (only one (denoted by 20) is shown), a public telephone landline network 22, a plurality of internet service providers 24a–24n and 24p–20z, etc. Although FIG. 1 shows the Internet 12 in a manner independent of the ISPs, it is within the scope of the present invention to define the internet as a world wide communication network that includes the ISPs.

The mobile communication network 20 is provided with a mobile central station 26 as with the network 18. Likewise, the landline network 22 has a land switching center 28. Further, only two mobile terminals 30 and 32 are shown, for the sake of simplifying the drawing, which are respectively subscribers to the mobile communication networks 18 and 20, while a telephone set 34 and a personal computer 36 are wired to the landline network 22.

As shown in FIG. 1, the communication networks 18, 20, and 22 are linked with one another, and further are linked to all the ISPs 24a–20n. It is to be noted that the center station 16 is directly coupled (linked) to the Internet. That is, the center station functions as an ISP and an e-mail memory (not shown).

As mentioned in the opening paragraphs, an electronic still camera using a charge-coupled device (for example) is gaining favor because the photo-images taken by the CCD camera can instantly be available. Further, the digital image data thus obtained can be transmitted across a mobile terminal to another display-equipped mobile terminal, a personal computer, etc. across the Internet. FIG. 1 schematically shows the manner wherein a CCD camera 38 is coupled using a wire to the mobile terminal 30 so as to transmit image data across the Internet.

The embodiment of the present invention will further be described with reference to FIGS. 2–4.

Figure 2:
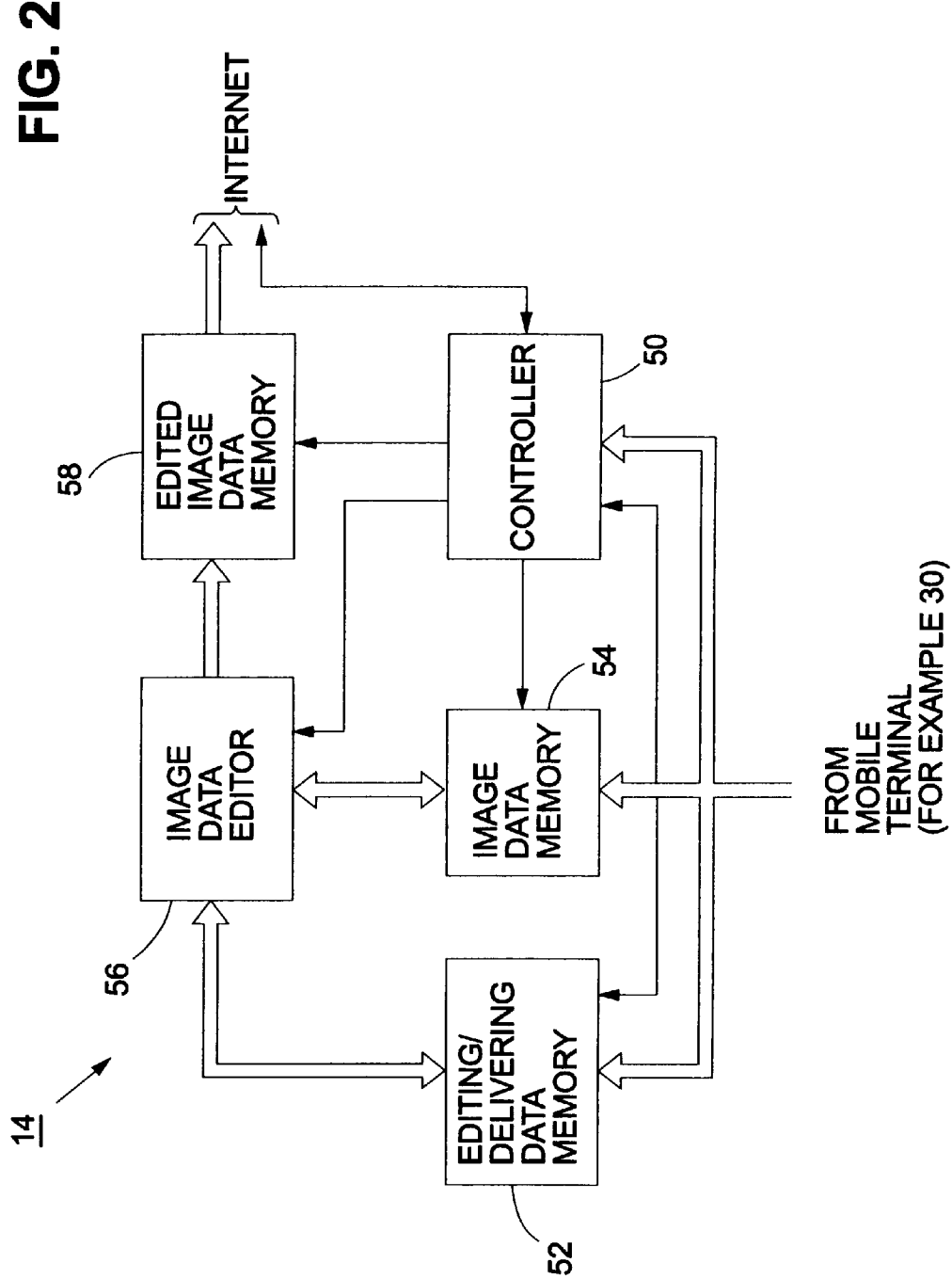
FIG. 2 is a block diagram schematically showing one portion of FIG. 1, which is directly concerned with the present invention.
Figure 3:
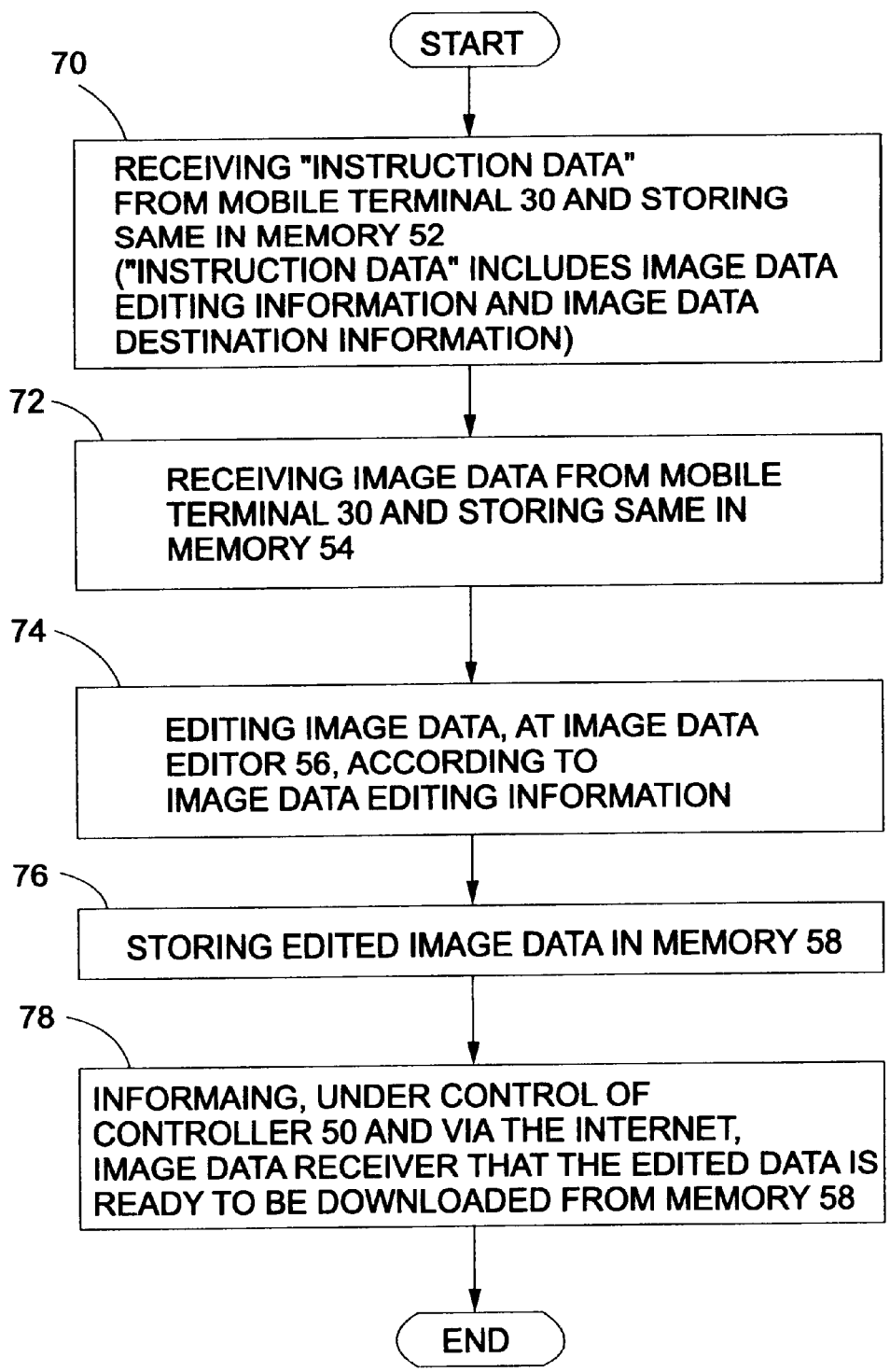
FIG. 3 is a flowchart which shows steps which characterize the operation of one embodiment of the present invention.

FIG. 2 schematically shows the arrangement of the image data editing/delivering apparatus 14 in block diagram form, while FIG. 3 is a flowchart which shows the steps which characterize the operation of the apparatus 14. On the other hand, FIG. 4 is a table listing examples of the image data edit and destination information.

Assuming that the mobile terminal 30 uploads the image data editing and image data destination information to the image data editing/delivering apparatus 14, after which the terminal 30 sends image data to the apparatus 14. Further, assuming that the subscriber carrying the mobile terminal 30 wishes to transmit one piece of image data to a person whose e-mail address is mrx@xx.nec.co.jp, as shown in the second row in FIG. 4. In this case, the subscriber in question wishes to edit his or her image data so as to be surrounded by a frame and also wishes to concurrently send a message "Happy New Year!! From Okinawa".

The subscriber, carrying the mobile terminal 30, dials one of predetermined phone numbers that are dedicated to the image data editing and delivering operations and are already prepared by the mobile communication network 18. When the communication link is established between the mobile terminal 30 and the network 18, the subscriber initiates to transmit the image data editing/delivering data (viz., instruction data) to the central station 16 (viz., the apparatus 14). More specifically, the apparatus 14 is supplied with the instruction data transmitted from the mobile terminal 30 and stores the same in an editing/delivering data memory 52 (FIG. 2) under control of a controller 50 (FIG. 2), which operation is shown as step 70 in FIG. 3.

In order for the controller 50 to confirm or distinguish the instruction data, it is preferable that the subscriber sends a suitable code preceding the instruction data. The above-mentioned message can usually be uploaded using dial keys. However, as an alternative, it might be possible to upload the message via voice if suitable voice-to-character translating software is installed in the central station 16 or the apparatus 14. The technique of how to upload the editing data (such as data of "frame (yes)" as shown in FIG. 4) is conventional and thus is not directly concerned with the present invention.

After the instruction data has been stored in the memory 52, the subscriber uploads the image data taken by the CCD camera 38, which image data is stored in an image data memory 54 (FIG. 2) under control of the controller 50 (step 72 of FIG. 3). Assuming that the image data in question contains only one picture image. As in the above case, in order for the controller 50 to confirm or distinguish the image data, the subscriber preferably sends a suitable code that precedes the image data.

Upon completion of the aforesaid data acquisition into the memories 52 and 54, the controller 50 instructs an image data editor 56 to perform the edition of the image data stored in the memory 54 according to the editing data stored in the memory 54 (step 74 of FIG. 3). The edited image data is then retained in an edited image data memory 58 under control of the controller 50.

Subsequently, the controller 50 transmits a message (viz., access data), which indicates that the edited image data is ready to be downloaded, to the e-mail address (in this case, mrx@xx.nec.co.jp) across the Internet (step 78 of FIG. 3). More specifically, the above-mentioned message or access data, dispatched from the controller 50, is stored in a memory provided in the appointed ISP, and includes an e-mail address, an identifying code, and a password, all of which are necessary for the person to whom the edited image data is to be transmitted, to download the edited message. In the above, the controller 50 accesses the memory 52 and retrieves the e-mail address of the destination.

The person to whom the image data is to be transmitted is thus able to download the edited image data if he or she accesses the e-mail address and obtained the above-mentioned access data.

The controller 50 also advises an access data to the subscriber, who carries the mobile terminal 30, for allowing him or her to review the edited image data, wherein the access data may take the same form as the aforesaid access data transmitted to the e-mail address of the edited image receiver. In this case, it is preferable that the subscriber, who has requested the image data editing and delivering, has an e-mail address linked to the subscriber's telephone number so that the controller 50 is able to send the access data to the e-mail address in the network 18.

It is to be noted that the order of the transmission of the editing/delivering data and the image data to the apparatus 14 can be reversed.

It is possible to design the operation of the apparatus 14 such that the image data receiver is permitted to obtain the edited data only after the image data sender (viz., the subscriber carrying the mobile terminal 30) has acknowledged the edited image data.

As shown in the third row of FIG. 4 (viz., the row including the second sender's telephone number), a given subscriber of the mobile communication network 18 is able to sequentially upload two picture images (in this particular case) while requesting the apparatus 14 to respectively deliver the two picture images to different destinations with differently edited images as shown in FIG. 4.

It will be understood that the above disclosure is representative of only one possible embodiment of the present invention and that the concept on which the invention is based is not specifically limited thereto.

What is claimed is:

1. A method of transmitting image data across the Internet, comprising the steps of:
    (a) receiving, at a particular station provided in a mobile communication network, instruction data transmitted thereto from a subscriber of said mobile communication network, said instruction data including image data editing information and image data destination information, and said mobile communication network being linked to the Internet;
    (b) receiving image data from said subscriber at said particular station said particular station being capable of receiving instructions and images from a plurality of subscribers;
    (c) editing said image data according to said image data editing information at said particular station;
    (d) storing the edited image data in a memory provided in said particular station; and
    (e) informing, across the Internet, an image data receiver, specified by said destination information, that the edited image data is ready to be downloaded from said memory by said image data receiver.

2. A method as claimed in claim 1, wherein said particular station is a central station for controlling an overall operation of said mobile communication network.

3. A method as claimed in claim 1, wherein said image data destination information includes an e-mail address of said image data receiver.

4. A method as claimed in claim 3, wherein the information sent to said image data receiver at step (e) is directed to said e-mail address of said image data receiver.

5. A method as claimed in claim 4, wherein the information sent to said image data receiver at step (e) includes an access data for enabling said image data receiver to download the edited image data.

6. A method as claimed in claim 5, wherein said access data includes an address, an identifying code, and a password.

7. A method as claimed in claim 1, further comprising:
    informing said subscriber that, after said image data has been edited, an access data for enabling said subscriber to have access to the edited image memory stored in said memory.

8. A method as claimed in claim 1, wherein said image data editing information includes one or more messages to be added to the edited image data.

9. A method as claimed in claim 1, wherein said image data editing information includes instructions for adding a margin to said image data.

10. A method as claimed in claim 1, wherein said image data includes a plurality of different picture images, and said destination information indicates another one or more image data receivers so that said different picture images can respectively be delivered to different image receivers.

11. An apparatus, provided in a particular station in a mobile communication network, for transmitting image data across the Internet, comprising:
    a controller for controlling an overall operation of said apparatus;
    an editing data memory for storing instruction data transmitted from a subscriber of said mobile communication network, said instruction data including image data editing information and image data destination information, and said mobile communication network being linked to the Internet;
    an image data memory for storing image data transmitted from said subscriber;
    an image data editor for editing said image data according to said image data editing information; and
    an edited image data memory for storing the edited image data;
    wherein said controller informs, across the Internet, an image data receiver specified by said destination information that the edited image data is ready to be downloaded from said memory by said image data receiver, and
    wherein said particular station is capable of receiving said instructions and said image data from a plurality of subscribers.

12. An apparatus as claimed in claim 11, wherein said particular station is a central station for controlling an overall operation of said mobile communication network.

13. An apparatus as claimed in claim 11, wherein said image data destination information includes an e-mail address of said image data receiver.

14. An apparatus as claimed in claim 13, wherein said controller informs said image data receiver, using said e-mail address, that the edited image data is ready to be downloaded from said memory by said image data receiver.

15. An apparatus as claimed in claim 13, wherein said controller transmits an access data to said e-mail address, said access data including an address, an identifying code, and a password for enabling said image data receiver to download the edited image data.

* * * * *